United States Patent
Montgomery et al.

(10) Patent No.: US 6,529,933 B1
(45) Date of Patent: Mar. 4, 2003

(54) METHOD AND APPARATUS FOR LOCKING AND UNLOCKING A SEMAPHORE

(75) Inventors: Michael Edward Montgomery, Starksboro, VT (US); Kevin Lee Sherman, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/902,369

(22) Filed: Jul. 29, 1997

Related U.S. Application Data

(63) Continuation of application No. 08/486,909, filed on Jun. 7, 1995, now abandoned.

(51) Int. Cl.[7] .............................................. G06F 9/00
(52) U.S. Cl. .................................................... 709/102
(58) Field of Search ................................. 709/100, 101, 709/102, 103, 104, 105, 106, 107, 316; 710/1, 119, 240

(56) References Cited

U.S. PATENT DOCUMENTS

| | | | |
|---|---|---|---|
| 4,604,683 A | 8/1986 | Russ et al. .................. 364/200 |
| 4,630,264 A | 12/1986 | Wah et al. | |
| 4,642,630 A | 2/1987 | Beckner et al. .......... 340/825.5 |
| 5,067,071 A | 11/1991 | Schanin et al. ............. 395/725 |
| 5,187,790 A | * 2/1993 | East et al. .................. 395/725 |
| 5,237,694 A | 8/1993 | Horne et al. | |
| 5,261,108 A | 11/1993 | Hayashi et al. ............. 395/725 |
| 5,276,886 A | 1/1994 | Dror .......................... 395/725 |
| 5,289,585 A | * 2/1994 | Kock et al. .................. 395/325 |
| 5,339,443 A | 8/1994 | Lockwood .................. 395/725 |
| 5,446,910 A | * 8/1995 | Kennedy et al. ............ 395/800 |
| 5,485,594 A | * 1/1996 | Foster ........................ 395/427 |

OTHER PUBLICATIONS

"An Introduction to operating systems" Harvey M. Dertel Addison–Wesley Publishing Company 1991.*
"Computer Architecture, A Quantitative Approach," David A. Patterson and John L. Hennessy, pp. 471–474, 1990.
"Computer Organization & Design, The Hardware/Software Interface," David A. Patterson and John L. Hennessy, pp. 614–616, 1990.

* cited by examiner

*Primary Examiner*—Majid Banankhah
(74) *Attorney, Agent, or Firm*—Mark F. Chadurjian

(57) ABSTRACT

A data processing system that automatically changes a semaphore in response to a test and set or clear and invalidate instruction. When a device desires to either test and set or clear and invalidate a semaphore, it transfers an instruction having a test and set or clear and invalidate operation code and the address of the semaphore over the bus. The device responsible for managing the semaphore receives the instruction and automatically changes the semaphore. Therefore, a device is only required to transfer the instruction to test and set or clear and invalidate the semaphore. Moreover, because the test and set operation requires only a single instruction transfer, special techniques are not necessary to insure exclusive access to the semaphore during the operation.

18 Claims, 3 Drawing Sheets

METHOD AND APPARATUS FOR LOCKING AND UNLOCKING A SEMAPHORE

This application is a continuation of application Ser. No. 08/486,909, filed on Jun. 7, 1995, which was abandoned upon the filing hereof.

TECHNICAL FIELD OF THE INVENTION

This invention is related in general to data processing systems and in specific to data processing systems using semaphores to enforce mutually exclusive access to resources.

BACKGROUND OF THE INVENTION

Multiprocessor data processing systems typically have a number of coordinated processes and devices that are working on a common task. These processes will often access shared resources, such as sections of memory or input/output devices. Each resource, however, can only be accessed by one process at a time. Therefore, the system must ensure that two processes do not simultaneously access the same resource.

Processes use semaphores, or lock variables, to coordinate and synchronize access to resources. A semaphore enforces mutual exclusion of a resource. Each resource has a corresponding semaphore. When a process requires access to a resource, it first checks the semaphore to determine whether the resource is available. If the resource is available, the process sets that resource's semaphore to indicate that it has exclusive access to that resource. Once the process is finished with the resource, it sets the semaphore to indicate that the resource is available.

Typically, a semaphore value of "0" indicates that the resource is free, while any other value indicates that the resource is locked. A process acquires a semaphore by using a series of instructions to perform an atomic "test and set lock" ("TSL") operation. A TSL operation copies the semaphore and then sets it to a positive value. To release a resource, a process uses a "clear and invalidate" ("CI") operation to set the semaphore to 0.

Prior art data processing systems required multiple bus transfers to perform either a TSL or CI operation. To perform a TSL operation, a process first sent a read instruction to a lock manager containing the address of the lock variable on the bus. Then, the lock manager sent a data transfer containing the value of the lock. Next, the process sent a write instruction containing the address of the lock. Finally, the process sent a data transfer containing the new value of the lock.

A CI operation also required multiple transfers. The process first sent an write instruction to the lock manager containing the address of the lock. Then, the process sent a data transfer containing the new lock value.

Sending multiple transfers to perform either a TSL or CI operation is inefficient. Each bus transfer sent by a process decreases the time the process has to perform other tasks. Likewise, the bus must complete the transfers, thereby decreasing the amount of other information that can be transferred.

In addition, a process had to ensure that no other process accessed the same semaphore during the atomic TSL operation. One technique to prevent access by another process was a bus lock pin, which allowed a process to perform back-to-back bus transfers. Another such technique was to let the process monitor the bus to detect any other access to the same semaphore address during the TSL operation.

However, each of the above techniques has undesirable consequences. The bus lock pin necessarily locks the bus, thereby temporarily disabling other processes and devices from using the bus. Similarly, bus monitoring requires additional logic for the device-bus interface. In addition, two processes could enter into a deadlock when trying to lock the same semaphore.

Therefore, there exists a need in the art for a method and apparatus for executing TSL and CI operations using fewer bus transfer per operation than the prior art. In addition, there exists a need in the art for a method and apparatus for executing an atomic TSL operation without locking or monitoring the bus.

SUMMARY OF THE INVENTION

It is an object of the present invention to provide a method and apparatus for increasing the processing speed of a data processing system.

It is another object of the present invention to provide a method and apparatus for efficiently controlling semaphores.

It is yet another object of the present invention to provide a method and apparatus for testing and setting a semaphore using one address bus transfer and one data bus transfer.

It is yet another object of the present invention to provide a method and apparatus for clearing and invalidating a semaphore using only an address bus transfer.

These and other objectives of the present invention are met by a data processing system that automatically changes a semaphore in response to a test and set or clear and invalidate instruction. When a device desires to either test and set or clear and invalidate a semaphore, it transfers an instruction having a test and set or clear and invalidate operation code and the address of the semaphore over the bus. The device responsible for managing the semaphore receives the instruction and automatically changes the semaphore. Therefore, a device is only required to transfer the instruction to test and set or clear and invalidate the semaphore. Moreover, because the test and set operation requires only a single instruction transfer, special techniques are not necessary to insure exclusive access to the semaphore during the operation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
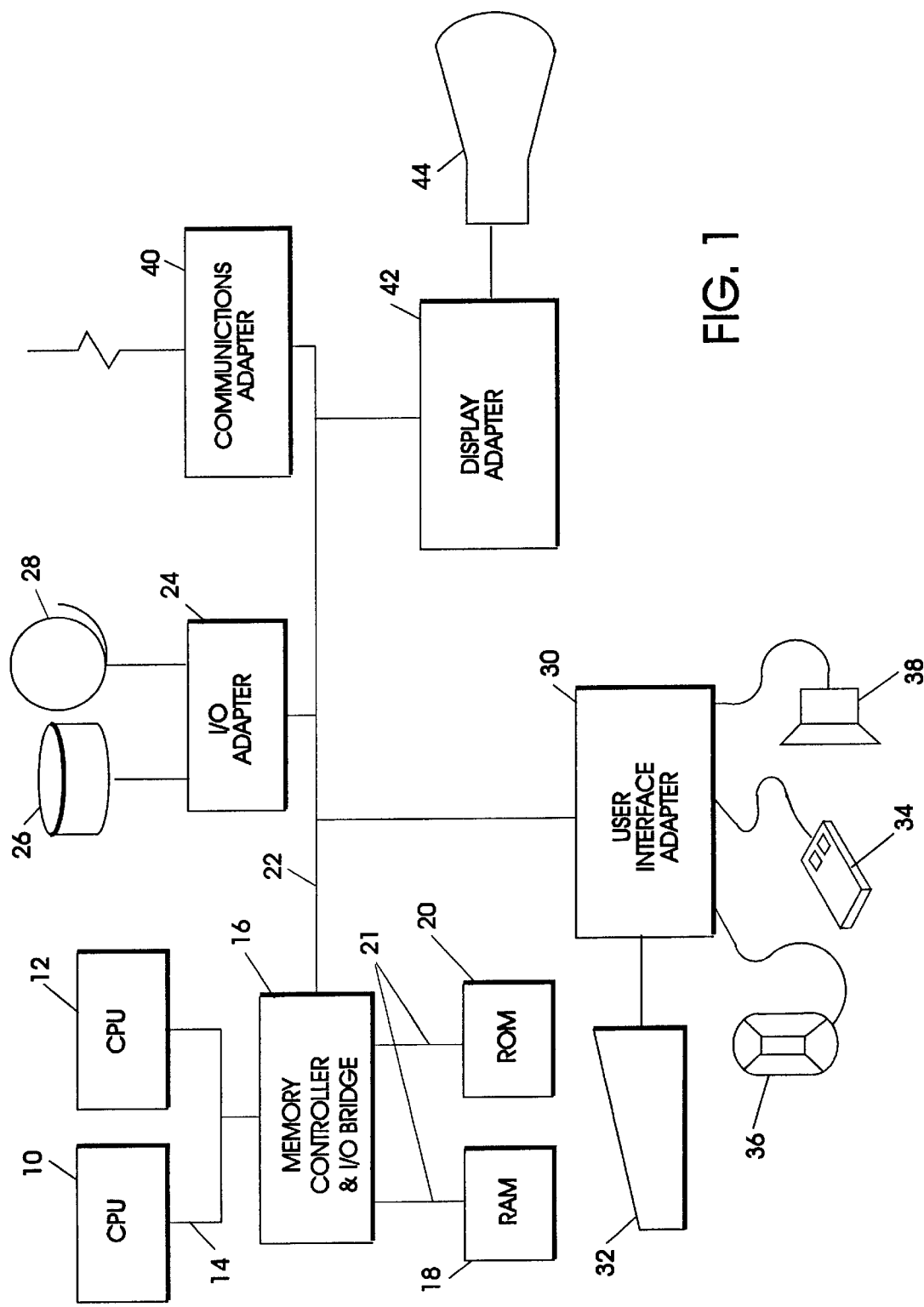
FIG. 1 illustrates a data processing system embodying the present invention.

A representative hardware environment for practicing the present invention is depicted in FIG. 1, which illustrates a typical hardware configuration of a workstation in accordance with the present invention having two processors 10, 12 such as conventional microprocessors, connected via common processor interface bus 14 (hereafter "processor bus") to a memory controller and input/output ("I/O") bridge 16 (hereafter "memory controller"). Memory controller 16 is connected to random access memory ("RAM") 18 and read only memory ("ROM") 20 via memory bus 21 and to a number of other units via common I/O bus 22. The workstation shown in FIG. 1 also includes I/O adapter 24 for connecting peripheral devices such as disk units 26 and tape drives 28 to I/O bus 22, user interface adapter 30 for connecting keyboard 32, mouse 34, microphone 36, speaker 38, and/or other user interface devices such as a touch screen device (not shown) to bus 22, communication adapter 40 for connecting the workstation to a data processing network, and display adapter 42 for connecting bus 22 to display device 44. In the present discussion, any device on processor bus 14, memory bus 21 or I/O bus 22 which is capable of being locked by a semaphore is referred to as a "resource."

CPUs 10, 12 can be any type of microprocessor. The only requirement is that the CPUs 10, 12 support address and data bus transfers with the capability to send address only transfers. Although FIG. 1 discloses a system with two CPUs 10, 12, the invention achieves utility in systems with any number of CPUs. In addition, the present invention works equally well in a data processing system with at least one multitasking processor. For purposes of this discussion, each process or task executing on a CPU 10, 12 is considered to be a separate "device."

Processor bus 14 connects the CPUs 10, 12 to memory manager 16. A preferred embodiment of processor bus 14 is actually two separate busses, one carrying instructions and the other carrying data. An alternative embodiment of processor bus 14, however, is a single bus carrying instructions and data. As used herein, "instruction" refers to a binary word comprising an operation code and an address. "Data," in contrast, refers to at least one word having any value. "Operation," used alone, refers to a sequence of steps or instructions executed by the data processing system.

Memory manager 16 manages CPU 10, 12 requests to access RAM 18, ROM 20, or I/O bus 22. I/O bus 22 carries data transmitted among the various system devices. Like the processor bus 14, I/O bus 22 can be comprised of a single bus or dual busses. In addition, devices on I/O bus 22 can access RAM 18 or ROM 20 by sending requests to memory manager 16. Memory bus 21 transfers data between RAM 18, ROM 20 and memory controller 16.

In a preferred embodiment of the present invention, semaphores are managed by memory controller 16. Thus, CPUs 10, 12 or any other device request semaphore locks and unlocks by sending requests to memory controller 16. However, any system device can manage semaphores as long all devices needing semaphores can send requests to the proper device.

A semaphore, or lock variable, may be stored at a specific address within RAM 18 or another place in the data processing system, such as a register associated with a resource. Each semaphore is represented as a binary word. In a preferred embodiment, a semaphore value of 0 indicates that the resource is free, while a positive value indicates the resource is locked.

Each semaphore is associated with a specific resource, such as RAM 18, that can be locked. Semaphores are most commonly used by processes executing on CPUs 10, 12 to synchronize and coordinate access to RAM 18. In such a case, processes can use a semaphore to lock specific addresses within RAM 18. In addition, processes will frequently use semaphores to lock I/O devices 24–44. However, the present invention is not limited to only processes and can be implemented to allow any device in the data processing system to lock any resource.

Figure 2:
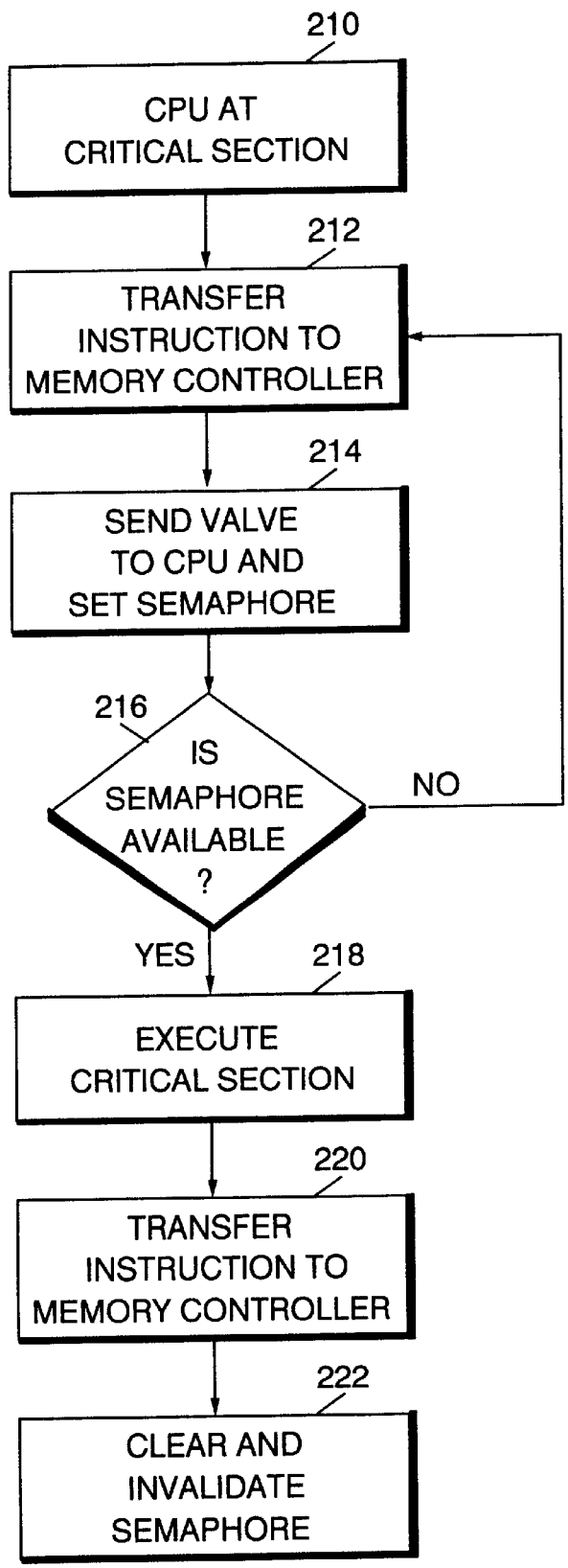
FIG. 2 is a flow chart showing the logical steps performed by a data processing system using semaphores in accordance with the present invention.

FIG. 2 is a flow chart showing the steps performed by a data processing system using semaphores in accordance with the present invention. In the example of FIG. 2, CPU 10 is the device using the semaphore. At step 210, CPU 10 is executing a process that needs to enter a critical section requiring exclusive access to a resource. A critical section is a procedure that cannot be executed simultaneously by another process.

At step 212, CPU 10 attempts to obtain a resource lock by executing a test and set lock ("TSL") operation on the desired resource's semaphore. When CPU 10 executes a TSL operation, it sends a processor bus instruction transfer to memory controller 16 containing a TSL operation code and an address. Then, at step 214, memory controller 16 determines from the operation code that it should read the current value of the semaphore at the specified address, send that value back to CPU 10, and then set the semaphore to a positive value.

After CPU 10 receives the value of the semaphore from memory controller 16, CPU 10 checks the value to determine whether the semaphore was 0 and, therefore, the resource was free (step 216). In such a case, CPU 10 can execute its critical section because it now has a lock on the resource (step 218).

If the value is positive at step 216, then another device already has the semaphore for the desired resource. In that case, CPU 10 will typically sit in a loop and spin-wait for the resource. That is, CPU 10 will loop back to step 212 and repeatedly execute TSL operations until it acquires the semaphore lock.

After CPU 10 has completed its critical section (step 218), it releases, or unlocks, the semaphore. To unlock the semaphore, CPU 10 executes a clear and invalidate operation ("CI"). This operation causes CPU 10 to send a processor bus 14 instruction transfer to memory controller 16 containing a CI operation code and an address (step 220). Then, memory controller 16 determines from the operation code that it should clear the semaphore at the specified address. At step 222, memory controller 16 releases the semaphore lock by clearing the memory location specified in the bus transfer.

It is important to note that memory controller 16 automatically changes the value of the semaphore in response to only an instruction transfer from CPU 10. That is, CPU 10 only transfers an operation code and an address to memory controller 16. CPU 10 does not send a data transfer to memory controller 16 indicating the value to place in the semaphore. Instead, memory controller 16 automatically sets the semaphore to 0 or a positive value, depending on the instruction it receives.

Figure 3:
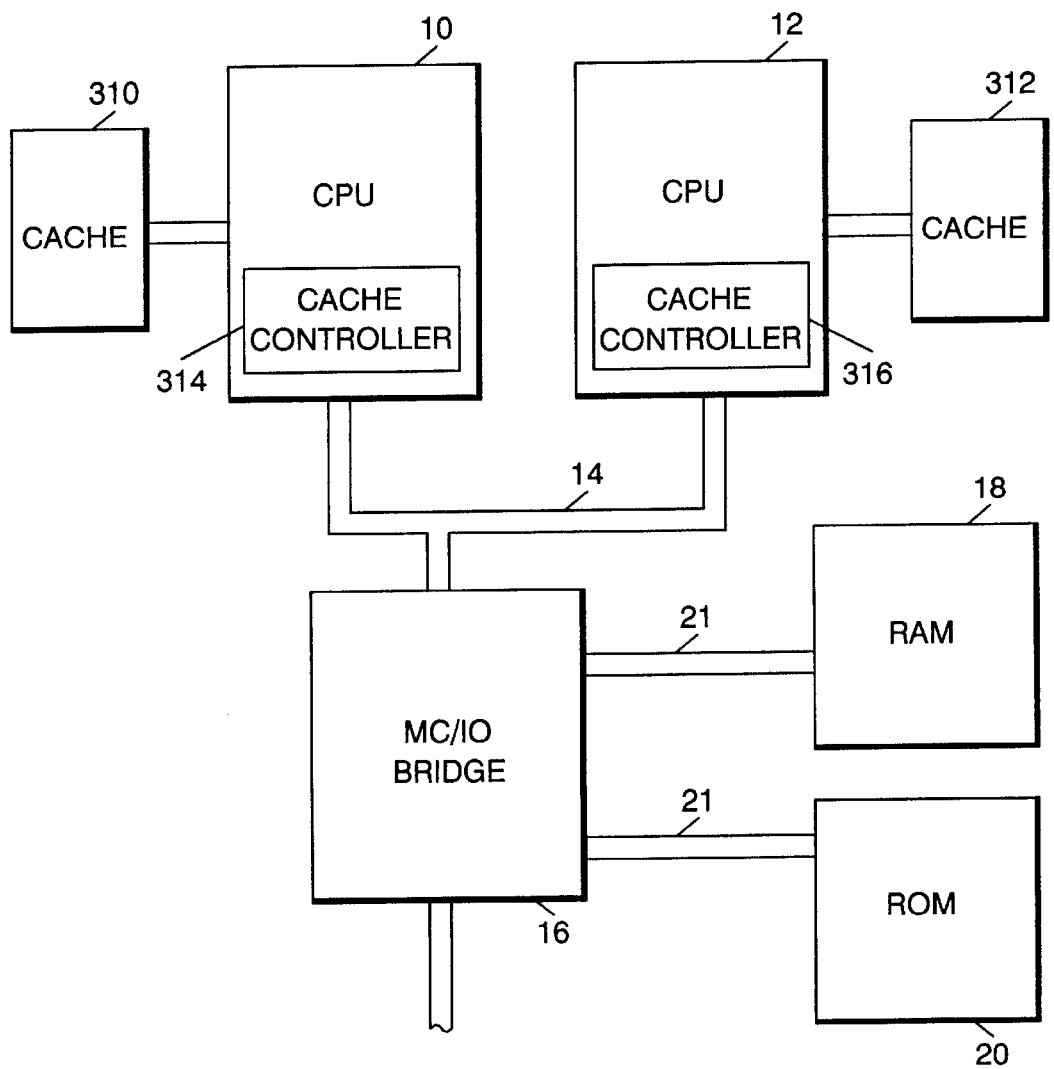
FIG. 3 is an alternative embodiment of the data processing system of FIG. 1.

FIG. 3 shows an alternative embodiment of the interface between the CPUs 10, 12 and memory controller 16. This embodiment is identical to the data processing system of FIG. 1, except that each CPU 10, 12 has an associated high speed memory cache 310, 312. Each cache 310, 312 holds copies of data found at memory addresses in main memory (RAM 18) recently accessed by its associated CPU 10, 12. This data can include semaphores. Each cache 310, 312 is managed by an associated cache controller 314, 316 which can be within or external to the CPU 10, 12. When a CPU 10, 12 seeks to access a cached memory address, the cache controller 314, 316 retrieves the data from the memory cache 310, 312. Thus, memory controller 16 is not involved in the memory access.

In the embodiment of FIG. 3, memory controller 16 and the cache controllers 314, 316 work together to ensure coherency between the cached memory 310, 312 and RAM 18. Techniques for maintaining cache coherency are well known in the prior art.

When CPU 10, for example, desires to lock a semaphore, cache controller 314 determines whether the semaphore is already within cache 310. If it is, cache controller 314 performs the TSL operation on the semaphore in its cache 310. If the semaphore has already been locked by another device, CPU 10 can spin-wait on the local copy of the semaphore, thereby reducing processor bus 14 traffic.

If the semaphore is not already within cache 310, cache controller 314 sends a TSL instruction transfer on bus 14. Then, memory controller 16 reads the current value of the semaphore, sends that value back to cache controller 314, and then sets the semaphore to a positive value. The cache controller 314 sends the value received on to CPU 10 and stores a positive value in cache 310. For a multitasking processor, this process insures that another process running on CPU 10 will get the correct value of the semaphore when it reads the value from cache 310.

CPU 10 checks the value received from cache controller 314 to determine whether the semaphore was 0, indicating the resource was free. If the semaphore has already been locked by another device, CPU 10 will spin-wait on its local copy of the semaphore, thereby reducing processor bus 14 traffic.

When CPU 10 desires to unlock the semaphore, cache controller 314 determines whether the semaphore is still in its cache 310. If so, and if cache controller 314 has an exclusive copy, then it will clear the semaphore in its cache, and no processor bus transfer is required. If the semaphore is no longer in cache 310, then cache controller 314 sends a CI instruction transfer on bus 14. In response, memory controller 16 clears the semaphore. The other cache controller 316 detects the CI instruction on processor bus 14 and checks to see if it has a copy of the semaphore. If so, and the cache line is not modified, then cache controller 316 invalidates its own cached copy or clears its own copy of the semaphore.

Although the present invention and its advantages have been described in detail, it should be understood that various changes, substitutions and alterations can be made herein without departing from the spirit and scope of the invention as defined by the appended claims.

What is claimed is:

1. A data processing system for arbitrating between exclusive requests for a resource comprising:
   a device for sending requests to lock and unlock the resource, wherein each request is an instruction;
   an addressable memory for storing variables;
   a bus for coupling said device to said memory;
   a variable associated with the resource, wherein the variable is stored in the memory at an address and the variable indicates whether the resource is locked; and
   lock management means for locking and unlocking the resource by changing the variable in response to requests from the device to a single bus operation carried out in response to a single instruction wherein one of said requests is transferred on said bus to thereby avoid multiple bus operations to change the variable wherein the lock instruction contains solely a test and set lock operation code and the address of the variable and the unlock instruction contains solely a clear and invalidate operation code and the address of the variable.

2. The data processing system of claim 1, wherein the lock management means further comprises:
   means for determining an operation code and an address from the instruction;
   means for testing and setting the variable at the address if the operation code is a test and set lock operation code; and
   means for clearing and invalidating the variable at the address if the operation code is a clear and invalidate code.

3. The data processing system of claim 1, wherein the bus transfers instructions and data from the device to the lock management means; and
   wherein the look management means locks and unlocks the variable in response to only said single instruction transferred from the device.

4. The data processing system of claim 3, wherein the bus further comprises:
   an instruction bus for transferring instructions from the device to the lock management means; and
   a data bus for transferring data from the device to the lock management means.

5. The data processing system of claim 1, further comprising:
   a memory cache associated with the device, wherein the memory cache stores a copy of the variable and the lock management means changes the copy of the variable in response to requests from the device.

6. The data processing of claim 1, wherein the device is central processing unit.

7. A method of arbitrating between devices seeking exclusive access to a resource in a data processing system having an addressable memory, comprising the steps of:
   sending a test and set lock request from a device to lock management means in order to test and set a value of a variable stored at a memory address, wherein the lock request is a first instruction that does not include a lock value for said variable;
   setting said lock value of said variable, by the lock management means, to indicate that the resource is locked;
   sending a request to unlock the resource from the device to the lock management means, wherein the unlock request is a second instruction that does not include an unlock value for said variable; and
   setting said unlock value of said variable, by the lock management means to indicate that the resource is unlocked;
   setting the values in the setting steps, by the lock management means, in response to a single bus operation carried out in response to solely said first and second instructions wherein either the lock request or the unlock request is transferred on a bus to thereby avoid multiple bus operations to change the value.

8. The method of claim 7, wherein the lock and unlock instructions each contain solely an operation code and an address.

9. The method of claim 8, wherein the operation code of the lock request is a test and set lock code and the operation code of the unlock request is a clear and invalidate code.

10. The method of claim 7, wherein the sending steps transfer the requests on [a] the bus.

11. The method of claim 10, wherein the bus comprises an instruction bus for transferring instructions and a data bus for transferring data.

12. The method of claim 10, wherein each sending step is performed by sending an operation code and an address on the bus.

13. The method of claim 7, further comprising the step of:
copying the value to a memory cache associated with the device;
wherein the setting steps operate on the value in the cache.

14. The method of claim 7, wherein the device is a central processing unit.

15. A data processing system for arbitrating between exclusive requests for a resource comprising:
first and second processors for sending requests to lock and unlock the resource, wherein each request is an instruction;
an addressable memory for storing variables;
a bus for coupling said processors to said memory variable associated with the resource, wherein the variable is stored in the memory at an address and the variable indicates whether the resource is locked;
lock management means for locking and unlocking the resource by changing the variable in response to a single bus operation carried out in response to a single instruction wherein one of said requests is transferred on said bus to thereby avoid multiple bus operations to change the variable, wherein the lock instruction contains solely a test and set lock instruction code and the address of the variable and the unlock instruction contains solely a clear and invalidate operation code and the address of the variable.

16. The data processing system for claim 15, wherein the memory further comprises:
a main memory for storing the variable;
first and second caches associated with the first and second processors, respectively, for holding copies of the variable; and
first and second cache controllers associated with the first and second caches, respectively, for maintaining coherency between data in the first and second caches and the main memory, wherein the first and second processors access the copies to determine whether the resource is locked.

17. The data processing system of claim 15 wherein the bus transfers instructions and data from the processors to the lock management means; and
wherein the lock management means locks and unlocks the variable in response to only said first and second instructions from the processor.

18. The data processing system of claim 17, wherein the bus further comprises:
an instruction bus for transferring instructions from the processors to the lock management means; and
a data bus for transferring data from the processors to the lock management means.

* * * * *